United States Patent
Foti

(10) Patent No.: US 11,902,393 B2
(45) Date of Patent: Feb. 13, 2024

(54) PROXY-CALL SESSION CONTROL FUNCTION (P-CSCF) TO P-CSCF COMMUNICATION

(71) Applicant: Telefonaktiebolaget LM Ericsson (publ), Stockholm (SE)

(72) Inventor: George Foti, Quebec (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/772,348

(22) PCT Filed: Jun. 2, 2020

(86) PCT No.: PCT/IB2020/055200
§ 371 (c)(1),
(2) Date: Apr. 27, 2022

(87) PCT Pub. No.: WO2021/090077
PCT Pub. Date: May 14, 2021

(65) Prior Publication Data
US 2022/0377152 A1 Nov. 24, 2022

Related U.S. Application Data

(60) Provisional application No. 62/932,790, filed on Nov. 8, 2019.

(51) Int. Cl.
| | | |
|---|---|---|
| *H04L 67/52* | (2022.01) | |
| *H04L 65/1069* | (2022.01) | |
| *H04L 65/1033* | (2022.01) | |
| *H04L 65/1016* | (2022.01) | |
| *H04L 65/1045* | (2022.01) | |
| *H04L 65/1104* | (2022.01) | |

(52) U.S. Cl.
CPC .......... *H04L 67/52* (2022.05); *H04L 65/1016* (2013.01); *H04L 65/1033* (2013.01);
(Continued)

(58) Field of Classification Search
CPC . H04L 67/52; H04L 65/1045; H04L 65/1016; H04L 65/1033
See application file for complete search history.

(56) References Cited

U.S. PATENT DOCUMENTS

2019/0261449 A1* 8/2019 Kim .................... H04L 65/1046
2019/0306754 A1 10/2019 Shan et al.

FOREIGN PATENT DOCUMENTS

| EP | 3664500 A1 | 6/2020 |
|---|---|---|
| WO | 2019154413 A1 | 8/2019 |

(Continued)

OTHER PUBLICATIONS

Huawei, "Solution for IMS traffic local routing", 3GPP Draft; S2-182979—Revision of S2-182359 Revision of S2-182177—Solution for IMS Traffic Local Routing, 3rd Generation Partnership Project, (3GPP), Mobile Competence Centre; vol. SA WG2, Montreal, Canada; Mar. 5, 2018 (Year: 2018).*

(Continued)

*Primary Examiner* — Suraj M Joshi
(74) *Attorney, Agent, or Firm* — Sage Patent Group

(57) ABSTRACT

Apparatuses and methods for P-CSCF to P-CSCF communication are disclosed. In one embodiment, a method implemented in a first proxy-call session control function (P-CSCF) node includes receiving, via a first user plane associated to an Internet Protocol (IP) Multimedia Subsystem (IMS) Protocol Data Unit (PDU) session for a user equipment (UE), a session initiation protocol (SIP) INVITE message; and as a result of the SIP INVITE message and based on a location of the UE relative to a first access gateway (AGW) associated to the first P-CSCF node, determining whether or not to initiate use of at least one of an additional second user plane and an additional second AGW for the IMS PDU session for the UE, the at least one of the (Continued)

second user plane and the second AGW being closer to the UE than the first user plane.

18 Claims, 8 Drawing Sheets

(52) U.S. Cl.
CPC ...... *H04L 65/1045* (2022.05); *H04L 65/1069* (2013.01); *H04L 65/1104* (2022.05)

(56) References Cited

FOREIGN PATENT DOCUMENTS

| WO | 2019160376 A1 | 8/2019 | |
|---|---|---|---|
| WO | WO-2019154413 A1 * | 8/2019 | ......... H04L 65/1006 |

OTHER PUBLICATIONS

PCT International Search Report and Written Opinion dated Aug. 7, 2020 for International Application No. PCT/IB2020/055200, 13 pages.

3GPP, 3GPP TS 23.501, Technical Specification Group Services and System Aspects, "System Architecture for the 5G System", Stage 2 (Release 16), V16.0.2 (Apr. 2019), Valbonne, France, 317 pages.

Huawei et al., :Solution for IMS Traffic Local Routing, SA WG2 Meeting #126, S2-182979, Revision of S2-182359, Revision of S2-182177, Feb. 26-Mar. 2, 2018, Montreal, Canada, XP051408866, 3 pages.

Communication Under Rule 71(3) EPC Intention to Grant dated Jul. 31, 2023 for European Patent Application No. 20731967.4, 5 pages.

* cited by examiner

PROXY-CALL SESSION CONTROL FUNCTION (P-CSCF) TO P-CSCF COMMUNICATION

CROSS-REFERENCE TO RELATED APPLICATIONS

This application is a 35 U.S.C. § 371 national stage application for International Application No. PCT/IB2020/055200, entitled "PROXY-CALL SESSION CONTROL FUNCTION (P-CSCF) TO P-CSCF COMMUNICATION", filed on Jun. 2, 2020, the disclosures and contents of which are hereby incorporated by reference in their entireties. Further, the present application claims the benefit of and priority to U.S. Provisional Patent Application No. 62/932,790, filed on Nov. 8, 2019, entitled "PROXY-CALL SESSION CONTROL FUNCTION (P-CSCF) TO P-CSCF COMMUNICATION", the disclosure of which is hereby incorporated herein by reference in its entirety.

TECHNICAL FIELD

Wireless communication and in particular, methods and apparatuses for P-CSCF to P-CSCF communication.

BACKGROUND

The IP Multimedia Subsystem (hereinafter IMS) enables operators of a Public Land Mobile Network (hereinafter PLMN) to provide their subscribers with multimedia services based and built on Internet applications, services and protocols. Different services and applications can be offered on top of IMS. In particular, User Plane (UP) optimization studies for IMS sessions are ongoing in the Third Generation Partnership Project (3GPP). For example, several solutions have been published in, for example, 3GPP Technical Report (TR) 23.790. However, existing solutions are lacking.

SUMMARY

Some embodiments advantageously provide methods and apparatuses for UP optimization for IMS sessions. In one aspect, some embodiments address how to handle a user equipment (UE) location change and, in particular, some embodiments provide arrangements for changing the access gateway (AGW) associated with a P-CSCF mid-session as a result of a UE location change.

In one embodiment, a method implemented in a first proxy-call session control function (P-CSCF) node includes receiving, via a first user plane associated to an Internet Protocol (IP) Multimedia Subsystem (IMS) Protocol Data Unit (PDU) session for a user equipment (UE), a session initiation protocol (SIP) INVITE message; and as a result of the SIP INVITE message and/or based on a location of the UE relative to a first access gateway (AGW) associated to the first P-CSCF node, determining whether or not to initiate use of an additional second user plane and/or an additional second AGW for the IMS PDU session for the UE, the second user plane and/or the second AGW being closer to the UE than the first user plane.

In another embodiment, a method implemented in an access and mobility management (AMF) node includes receiving a subscription request, from a P-CSCF node, to be notified when a location of a user equipment (UE) associated with an IMS PDU session is outside of a coverage area of a first access gateway (AGW), the subscription request including at least one of geographic coordinates indicating the coverage area of the first AGW and geographic coordinates indicating the location of the UE.

In yet another embodiment, a method implemented in a first P-CSCF node includes receiving a request from a second P-CSCF node to reserve at least one Internet Protocol (IP) address in an access gateway (AGW) controlled by the first P-CSCF node for a user plane and a local application server (AS) associated with an IMS PDU session for a user equipment (UE); and/or sending, to the second P-CSCF node, the at least one IP address reserved in the second AGW for the user plane and the local AS to use.

According to one aspect of the present disclosure, a method implemented in a first proxy-call session control function (P-CSCF) node is provided. The method includes receiving, via a first user plane associated to an Internet Protocol (IP) Multimedia Subsystem (IMS) Protocol Data Unit (PDU) session for a user equipment (UE), a session initiation protocol (SIP) INVITE message; and as a result of the SIP INVITE message and based on a location of the UE relative to a first access gateway (AGW) associated to the first P-CSCF node, determining whether or not to initiate use of at least one of an additional second user plane and an additional second AGW for the IMS PDU session for the UE, the at least one of the second user plane and the second AGW being closer to the UE than the first user plane.

In some embodiments of this aspect, determining whether or not to initiate the use of the at least one of the additional second user plane and the additional second AGW for the IMS PDU session further comprises determining, based on session information of the IMS PDU session, whether or not to initiate use of a local application server (AS) for the IMS PDU session for the UE. In some embodiments of this aspect, determining whether or not to initiate the use of the at least one of the additional second user plane and the additional second AGW for the IMS PDU session further comprises determining based at least in part on a media type indicated in the session information. In some embodiments of this aspect, the method further includes subscribing to an access and mobility management function (AMF) to be notified when a location of the UE is outside of a coverage area of the first AGW, the subscribing including at least one of geographic coordinates indicating the coverage area of the first AGW and geographic coordinates indicating the location of the UE.

In some embodiments of this aspect, the method further includes, as a result of the subscribing, receiving a notification that the location of the UE is outside of the coverage area of the first AGW, the location of the UE indicated in geographic coordinates in the received notification; and/or responsive to the received notification, selecting the additional second AGW that has a coverage area corresponding to the indicated location of the UE and/or identifying a second P-CSCF node that controls the second AGW. In some embodiments of this aspect, identifying the additional second AGW further includes using a table indicating a plurality of AGWs, coverage areas associated with each of the plurality of AGWs and, for each of the plurality of AGWs, an identifier of a P-CSCF node controlling the corresponding one or more AGWs.

In some embodiments of this aspect, the method further includes communicating with the second P-CSCF node, via a P-CSCF-to-P-CSCF interface, to initiate a context transfer to the second P-CSCF node. In some embodiments of this aspect, communicating with the second P-CSCF node, via a P-CSCF-to-P-CSCF interface, further comprises at least one of: requesting that the second P-CSCF node reserve at least one Internet Protocol (IP) address in the second AGW for the second user plane and the local AS; providing, to the second P-CSCF node, addresses associated with the second user plane and the local AS to allow the second P-CSCF node to set-up the second AGW for the second user plane and the local AS for the IMS PDU session for the UE; receiving, from the second P-CSCF node, the addresses reserved in the second AGW for the second user plane and the local AS to use; and subscribing to the AMF to be notified when the location of the UE is outside of a coverage area of the second AGW.

According to another aspect of the present disclosure, a first proxy-call session control function (P-CSCF) node is provided. The first P-CSCF node includes processing circuitry. The processing circuitry is configured to cause the first P-CSCF node to receive, via a first user plane associated to an IMS PDU session for a user equipment (UE), a session initiation protocol (SIP) INVITE message; and as a result of the SIP INVITE message and based on a location of the UE relative to a first access gateway (AGW) associated to the first P-CSCF node, determine whether or not to initiate use of at least one of an additional second user plane and an additional second AGW for the IMS PDU session for the UE, the at least one of the second user plane and the second AGW being closer to the UE than the first user plane.

In some embodiments of this aspect, the processing circuitry is further configured to cause the first P-CSCF node to determine whether or not to initiate the use of the at least one of the additional second user plane and the additional second AGW for the IMS PDU session by being configured to cause the first P-CSCF node to determine, based on session information of the IMS PDU session, whether or not to initiate use of a local application server (AS) for the IMS PDU session for the UE. In some embodiments of this aspect, the processing circuitry is further configured to cause the first P-CSCF node to determine whether or not to initiate the use of the at least one of the additional second user plane and the additional second AGW for the IMS PDU session by being configured to cause the first P-CSCF node to determine based at least in part on a media type indicated in the session information.

In some embodiments of this aspect, the processing circuitry is further configured to cause the first P-CSCF node to subscribe to an access and mobility management function (AMF) to be notified when a location of the UE is outside of a coverage area of the first AGW, the subscription request including at least one of geographic coordinates indicating the coverage area of the first AGW and geographic coordinates indicating the location of the UE. In some embodiments of this aspect, the processing circuitry is further configured to cause the first P-CSCF node to, as a result of the subscription, receive a notification that the location of the UE is outside of the coverage area of the first AGW, the location of the UE indicated in geographic coordinates in the received notification; and responsive to the received notification, select the additional second AGW that has a coverage area corresponding to the indicated location of the UE and/or identify a second P-CSCF node that controls the second AGW.

In some embodiments of this aspect, the processing circuitry is further configured to cause the first P-CSCF node to identify the additional second AGW by being configured to cause the first P-CSCF node to use a table indicating a plurality of AGWs, coverage areas associated with each of the plurality of AGWs and, for each of the plurality of AGWs, an identifier of a P-CSCF node controlling the corresponding one or more AGWs. In some embodiments of this aspect, the processing circuitry is further configured to cause the first P-CSCF node to communicate with the second P-CSCF node, via a P-CSCF-to-P-CSCF interface, to initiate a context transfer to the second P-CSCF node.

In some embodiments of this aspect, the processing circuitry is further configured to cause the first P-CSCF node to communicate with the second P-CSCF node, via a P-CSCF-to-P-CSCF interface, by being configured to cause the first P-CSCF node to at least one of request that the second P-CSCF node reserve at least one Internet Protocol (IP) address in the second AGW for the second user plane and the local AS; provide, to the second P-CSCF node, addresses associated with the second user plane and the local AS to allow the second P-CSCF node to set-up the second AGW for the second user plane and the local AS for the IMS PDU session for the UE; receive, from the second P-CSCF node, the addresses reserved in the second AGW for the second user plane and the local AS to use; and subscribe to the AMF to be notified when the location of the UE is outside of a coverage area of the second AGW.

According to yet another aspect of the present disclosure, a method implemented in an access and mobility management (AMF) node is provided. The method includes receiving a subscription request, from a P-CSCF node, to be notified when a location of a user equipment (UE) associated with an IMS PDU session is outside of a coverage area of a first access gateway (AGW), the subscription request including at least one of geographic coordinates indicating the coverage area of the first AGW and geographic coordinates indicating the location of the UE.

In some embodiments of this aspect, the method further includes monitoring the location of the UE relative to the coverage area of the first AGW; and if the location of the UE moves outside of the coverage area of the first AGW, notifying the P-CSCF node that the location of the UE is outside of the coverage area of the first AGW, the location of the UE indicated in geographic coordinates in the notification.

According to another aspect of the present disclosure, an access and mobility management (AMF) node is provided. The AMF node includes processing circuitry. The processing circuitry is configured to cause the AMF node to receive a subscription request, from a P-CSCF node, to be notified when a location of a user equipment (UE) associated with an IMS PDU session is outside of a coverage area of a first access gateway (AGW), the subscription request including at least one of geographic coordinates indicating the coverage area of the first AGW and geographic coordinates indicating the location of the UE.

In some embodiments of this aspect, the processing circuitry is further configured to cause the AMF node monitor the location of the UE relative to the coverage area of the first AGW; and if the location of the UE moves outside of the coverage area of the first AGW, notify the P-CSCF node that the location of the UE is outside of the coverage area of the first AGW, the location of the UE indicated in geographic coordinates in the notification.

According to yet another aspect of the present disclosure, a method implemented in a first proxy-call session control function (P-CSCF) node is provided. The method includes receiving a request from a second P-CSCF node to reserve at least one Internet Protocol (IP) address in an access gateway (AGW) controlled by the first P-CSCF node for a user plane and a local application server (AS) associated with an IMS PDU session for a user equipment (UE); and sending, to the second P-CSCF node, the at least one IP address reserved in the second AGW for the user plane and the local AS to use.

In some embodiments of this aspect, at least one of: the receiving and sending is via a P-CSCF-to-P-CSCF interface; and receiving includes receiving, from the second P-CSCF node, addresses associated with the user plane and the local AS to allow the first P-CSCF node to set-up the AGW for the user plane for the IMS PDU session for the UE. In some embodiments of this aspect, the method further includes reserving the requested addresses in the AGW for the user plane and the local AS to use.

According to another aspect of the present disclosure, a first proxy-call session control function (P-CSCF) node is provided. The first P-CSCF node includes processing circuitry. The processing circuitry is configured to cause the first P-CSCF node to receive a request from a second P-CSCF node to reserve at least one Internet Protocol (IP) address in an access gateway (AGW) controlled by the first P-CSCF node for a user plane and a local application server (AS) associated with an IMS PDU session for a user equipment (UE); and send, to the second P-CSCF node, the at least one IP address reserved in the second AGW for the user plane and the local AS to use.

In some embodiments of this aspect, the processing circuitry is further configured to cause the first P-CSCF node to at least one of: receive and send via a P-CSCF-to-P-CSCF interface; and receive, from the second P-CSCF node, addresses associated with the user plane and the local AS to allow the first P-CSCF node to set-up the AGW for the user plane for the IMS PDU session for the UE. In some embodiments of this aspect, the processing circuitry is further configured to cause the first P-CSCF node to reserve the requested addresses in the AGW for the user plane and the local AS to use.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
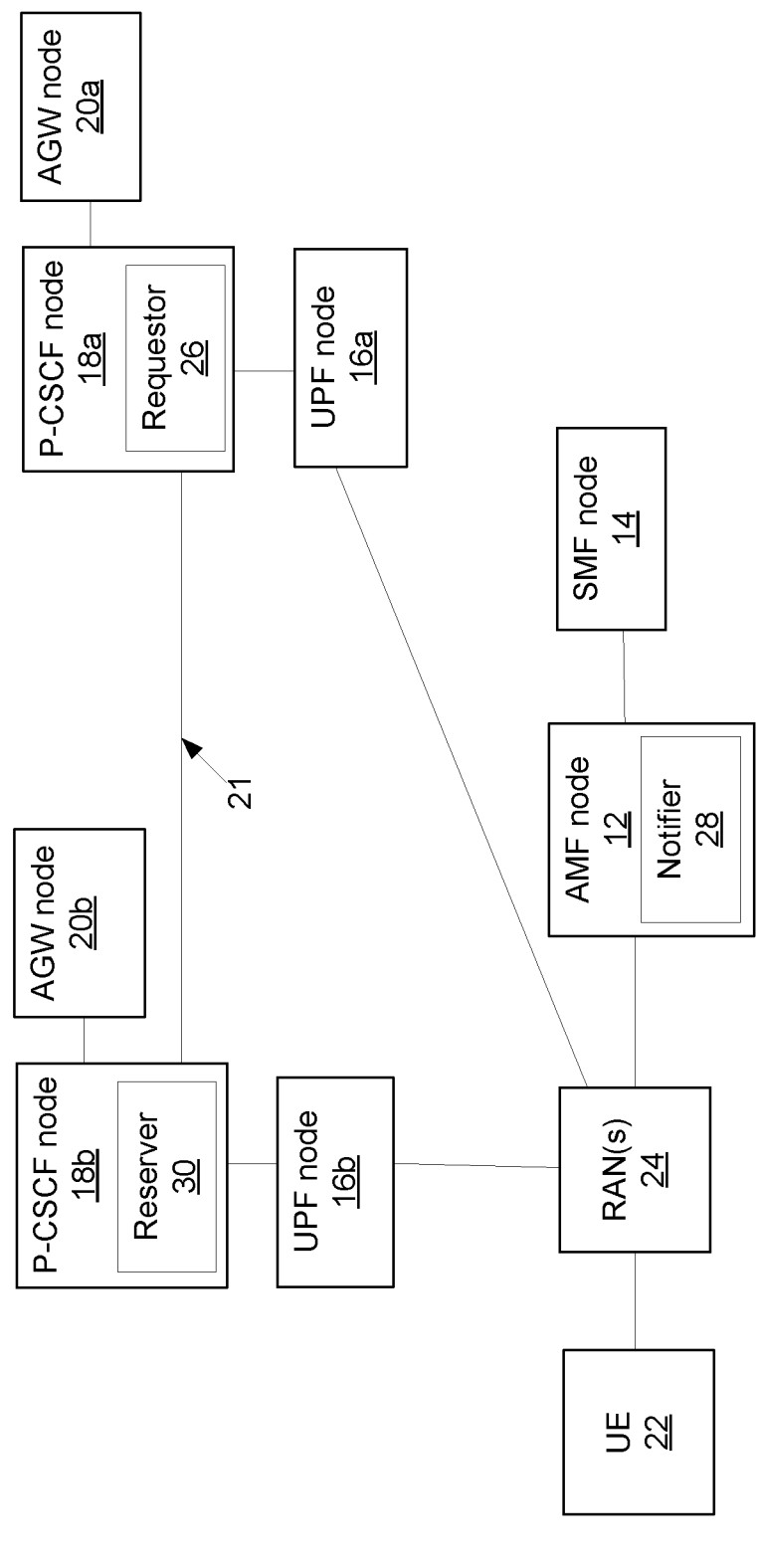
FIG. 1 illustrates another example system architecture according to some embodiments of the present disclosure.

In one aspect, some embodiments address how to handle a user equipment (UE) location change and, in particular, some embodiments provide arrangements for changing the access gateway (AGW) associated with a P-CSCF mid-session as a result of a UE location change mid-session.

One embodiment may include:
- if the UE moves to a new area outside the area controlled by the current/primary P-CSCF/AGW(-CSCF), it may be beneficial to use a new/target access gateway (AGW) which is controlled by another P-CSCF (secondary P-CSCF); thus, a P-CSCF to P-CSCF communication may be used for this.
- the primary P-CSCF where the UE is IMS registered may remain in the control plane (CP), but that same primary P-CSCF may be configured to communicate with the secondary P-CSCF that controls the target AGW. This communication may enable the primary P-CSCF to fully control the secondary AGW through requests issued to the secondary P-CSCF. Hence, in some embodiments, the secondary P-CSCF operates as a surrogate for the IMS session of the UE. All controls available to the secondary P-CSCF for the AGW can be requested through e.g., a new P-CSCF to P-CSCF interface between the two P-CSCFs from the primary P-CSCF including lawful intercept, etc. This interface can, in some embodiments, be a container enabling the primary P-CSCF to control the secondary AGW just as it controls its own AGW. Hence, the interface may relay the information to the secondary P-CSCF then to the secondary/target AGW.

Another embodiment may include:
- a P-CSCF that is configured to control multiple AGWs; hence, not requiring use of a P-CSCF to P-CSCF communication. In this embodiment, existing interfaces may be used.

For these embodiments, the P-CSCF may store an identity of the used AGW for an IMS session in its session state. The AGW may also store the identity of the P-CSCF that controls it. This can enable traceability, debugging, etc.

Before describing in detail exemplary embodiments, it is noted that the embodiments reside primarily in combinations of apparatus components and processing steps related to P-CSCF to P-CSCF communication. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an autonomous machine configured to communicate via IMS. The UE herein can by any type of communication device capable of communicating with another UE, an application server, a network node, a server, an IMS NF or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, a Proxy-Call Session Control Function (P-CSCF) node, a mobility management node (e.g., Mobility Management Entity (MME) and/or Access and Mobility Function (AMF)), a gateway (e.g., access gateway), a session management node (e.g., session management function (SMF) node), a user plane function (UPF) node or any network node. In some embodiments, the network node may be, for example, a subscriber database node, a core network node, a Fifth Generation (5G) and/or New Radio (NR) network node, an Evolved Packet System (EPS) node, an Internet Protocol (IP) Multimedia Subsystem (IMS) node, a Network Function (NF) node, an Serving-CSCF node, an Interrogating-CSCF node, a network repository function (NRF) node, a unified data management (UDM) node, a Network Exposure Function (NEF) node, a home subscriber server (HSS) node, a home location register (HLR) node, etc.

In yet other embodiments, the network node may include any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

Signaling may generally comprise one or more symbols and/or signals and/or messages. A signal may comprise or represent one or more bits and/or media packets. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein. Signaling associated to an interface may be transmitted via the interface.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

In some embodiments, a geographic location (e.g., as defined by e.g., geographic coordinates) may be considered different from a location that is defined by a cell identifier or tracking area.

In some embodiments, the term "close" and "closer" is used and may indicate an element or node or associated area (e.g., target AGW, UP, UPF, etc.) that is geographically close or geographically closer to e.g., a UE location as compared to another element or node or associated area (e.g., primary/initial AGW, initial UP, initial UPF for an IMS PDU session associated with the UE).

Any two or more embodiments described in this disclosure may be combined in any way with each other.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, $3^{rd}$ Generation Partnership Project (3GPP), Long Term Evolution (LTE), $5^{th}$ Generation (5G) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a P-CSCF node, an AMF node, or any other network node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, there is shown in FIG. 1 a schematic diagram of the communication system 10, according to an embodiment, constructed in accordance with the principles of the present disclosure. The communication system 10 in FIG. 1 is a non-limiting example and other embodiments of the present disclosure may be implemented by one or more other systems and/or networks. Referring to FIG. 1, the system 10 includes an AMF node 12, an SMF node 14, one or more UPF nodes 16a and 16b (collectively referred to as UPF node 16). The system 10 may include a first P-CSCF node 18a and a second P-CSCF node 18b and associated access gateway (AGW) nodes 20a and 20b, respectively. In some embodiments, there may be a P-CSCF-to-P-CSCF interface 21 between P-CSCF node 18a and 18b for communications between P-CSCFs 18 according to some embodiments of the present disclosure. In other embodiments, the system 10 may not include the P-CSCF-to-P-CSCF interface 21 but the P-CSCF to P-CSCF communications may be implemented using existing interfaces. In some embodiments, the system 10 may not include the P-CSCF-to-P-CSCF direct interface 21, but the P-CSCF to P-CSCF communications may be indirect and performed via existing interfaces, e.g., through the UPFs, ostensibly using the UPF as a router.

The system 10 may further include a user equipment (UE) 22 and one or more radio access networks (RANs) 24. The RAN(s) 24 may include, e.g., 5G RAN also known as NR RAN, which may provide radio access to the UE 22. The various nodes may support one or more of the techniques disclosed herein for arranging the UP (e.g., UPF node 16, etc.) closer to the UE 22 when a UE 22 changes location mid-session according to some embodiments of the present disclosure. It should be understood that the system 10 may include numerous nodes of those shown in FIG. 1, as well as, additional nodes not shown in FIG. 1. In addition, the system 10 may include many more connections/interfaces than those shown in FIG. 1. For example, there may be a connection/interface between the SMF and each of the UPFs as the SMF may in some embodiments control both UPFs.

The system 10 may include one or more nodes having a requestor 26, a notifier 28 and/or a reserver 30. The P-CSCF node 18 may include the requestor 26 which may be configured to one or more of: receive, via a first user plane associated to an IMS PDU session for a user equipment (UE), a session initiation protocol (SIP) INVITE message; and/or as a result of the SIP INVITE message and/or based on a location of the UE relative to a first access gateway (AGW) associated to the first P-CSCF node, determine whether or not to initiate use of an additional second user plane and/or an additional second AGW for the IMS PDU session for the UE, the second user plane and/or the second AGW being closer to the UE than the first user plane.

The AMF node 12 may include the notifier 28 which may be configured to receive a subscription request, from a P-CSCF node, to be notified when a location of a user equipment (UE) associated with an IMS PDU session is outside of a coverage area of a first access gateway (AGW), the subscription request including at least one of geographic coordinates indicating the coverage area of the first AGW and geographic coordinates indicating the location of the UE.

In some embodiments, the P-CSCF node 18 may include the reserver 30 which may be configured to one or more of receive a request from a second P-CSCF node to reserve at least one Internet Protocol (IP) address in an access gateway (AGW) controlled by the first P-CSCF node for a user plane and a local application server (AS) associated with an IMS PDU session for a user equipment (UE); and/or send, to the second P-CSCF node, the at least one IP address reserved in the second AGW for the user plane and the local AS to use.

Example implementations, in accordance with some embodiments, of a P-CSCF node 18, an AMF node 12, and another network node 32, which may include any of the network nodes discussed herein and will now be described with reference to FIG. 2.

The P-CSCF node 18 includes a communication interface 34, processing circuitry 36, and memory 38. The communication interface 34 may be configured to communicate with any of the nodes in the system 10 according to some embodiments of the present disclosure. In some embodiments, the communication interface 34 may be formed as or may include, for example, one or more radio frequency (RF) transmitters, one or more RF receivers, and/or one or more RF transceivers, and/or may be considered a radio interface. In some embodiments, the communication interface 34 may also include a wired interface.

The processing circuitry 36 may include one or more processors 40 and memory, such as, the memory 38. In particular, in addition to a traditional processor and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the P-CSCF node 18 may further include software stored internally in, for example, memory 38, or stored in external memory (e.g., database) accessible by the P-CSCF node 18 via an external connection. The software may be executable by the processing circuitry 36. The processing circuitry 36 may be configured to control any of the methods and/or processes described herein and/or to cause such methods, and/or processes to be performed, e.g., by the P-CSCF node 18 (e.g., P-CSCF nodes 18a and/or 18b, etc.). The memory 38 is configured to store data, programmatic software code and/or other information described herein. In some embodiments, the software may include instructions stored in memory 38 that, when executed by the processor 40 and/or requestor 26 and/or reserver 30 causes the processing circuitry 36 and/or configures the P-CSCF node 18 to perform the processes described herein with respect to the P-CSCF node 18 (e.g., processes described with reference to FIGS. 3 and/or 5 and/or any of the other flowcharts).

The AMF node 12 includes a communication interface 42, processing circuitry 44, and memory 46. The communication interface 42 may be configured to communicate with the UE 22 and/or other elements in the system 10 according to some embodiments of the present disclosure. In some embodiments, the communication interface 42 may be formed as or may include, for example, one or more radio frequency (RF) transmitters, one or more RF receivers, and/or one or more RF transceivers, and/or may be considered a radio interface. In some embodiments, the communication interface 42 may also include a wired interface.

The processing circuitry 44 may include one or more processors 48 and memory, such as, the memory 46. In particular, in addition to a traditional processor and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the AMF node 12 may further include software stored internally in, for example, memory 46, or stored in external memory (e.g., database) accessible by the AMF node 12 via an external connection. The software may be executable by the processing circuitry 44. The processing circuitry 44 may be configured to control any of the methods and/or processes described herein and/or to cause such methods, and/or processes to be performed, e.g., by the AMF node 12. The memory 46 is configured to store data, programmatic software code and/or other information described herein. In some embodiments, the software may include instructions stored in memory 46 that, when executed by the processor 48 and/or notifier 28, causes the processing circuitry 44 and/or configures the AMF node 12 to perform the processes described herein with respect to the AMF node 12 (e.g., processes described with reference to FIG. 4 and/or any of the other flowcharts).

The network node 32 (for ease of understanding and explanation, nodes such as an AS node, an SMF node, a UPF node, an AGW node, a policy control function (PCF) node, etc., are referred to collectively as network node 32) includes a communication interface 50, processing circuitry 52, and memory 54. The communication interface 50 may be configured to communicate with any of the nodes in the system 10 according to some embodiments of the present disclosure. In some embodiments, the communication interface 50 may be formed as or may include, for example, one or more radio frequency (RF) transmitters, one or more RF receivers, and/or one or more RF transceivers, and/or may be considered a radio interface. In some embodiments, the communication interface 50 may also include a wired interface.

The processing circuitry 52 may include one or more processors 56 and memory, such as, the memory 54. In particular, in addition to a traditional processor and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 32 may further include software stored internally in, for example, memory 54, or stored in external memory (e.g., database) accessible by the network node 32 via an external connection. The software may be executable by the processing circuitry 52. The processing circuitry 52 may be configured to control any of the methods and/or processes described herein and/or to cause such methods, and/or processes to be performed, e.g., by the network node 32 (e.g., an AMF node, an SMF node, a UPF node, an MME node and/or a gateway node, etc.). The memory 54 is configured to store data, programmatic software code and/or other information described herein. In some embodiments, the software may include instructions stored in memory 54 that, when executed by the processor 56, causes the processing circuitry 52 and/or configures the network node 32 to perform the processes described herein with respect to the network node 32 (e.g., an AMF node, an SMF node, a UPF node, an MME node and/or a gateway node, etc.).

Figure 2:
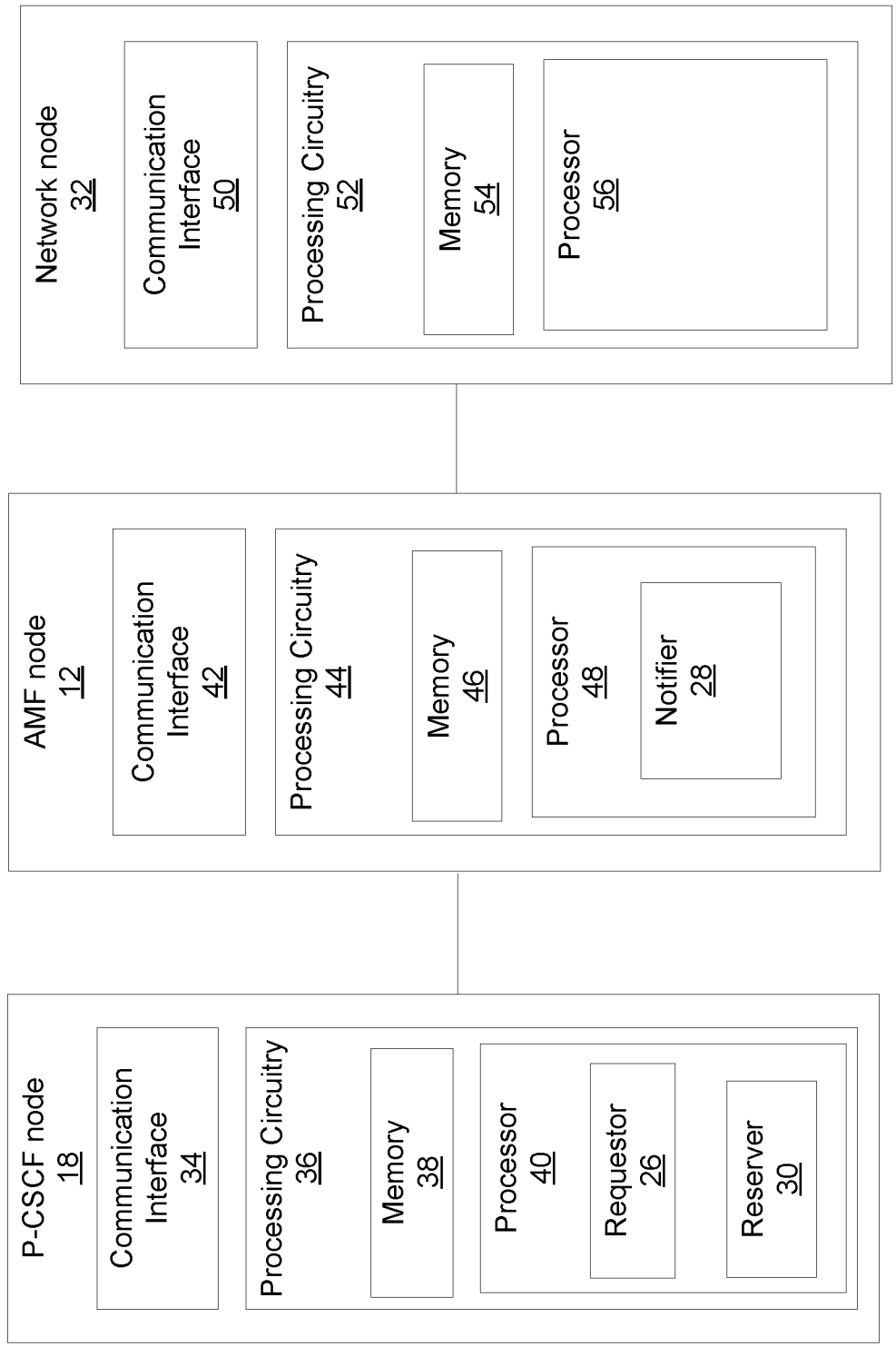
FIG. 2 illustrates yet another example system architecture and example hardware arrangements for devices in the system, according to some embodiments of the present disclosure.

In FIG. 2, the connection between the P-CSCF node 18, AMF node 12 and network node 32 is shown without explicit reference to any intermediary devices or connections. However, it should be understood that intermediary devices and/or connections may exist between these devices, although not explicitly shown. It is also understood that P-CSCF node 18, AMF node 12 and network node 32 may be connected to a cloud network and in communication with each other over that cloud network. In other words, although the P-CSCF node 18, AMF node 12 and network node 32 are shown connected serially, such is not necessarily the case.

Although FIG. 2 shows requestor 26, reserver 30 and notifier 28, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Figure 3:
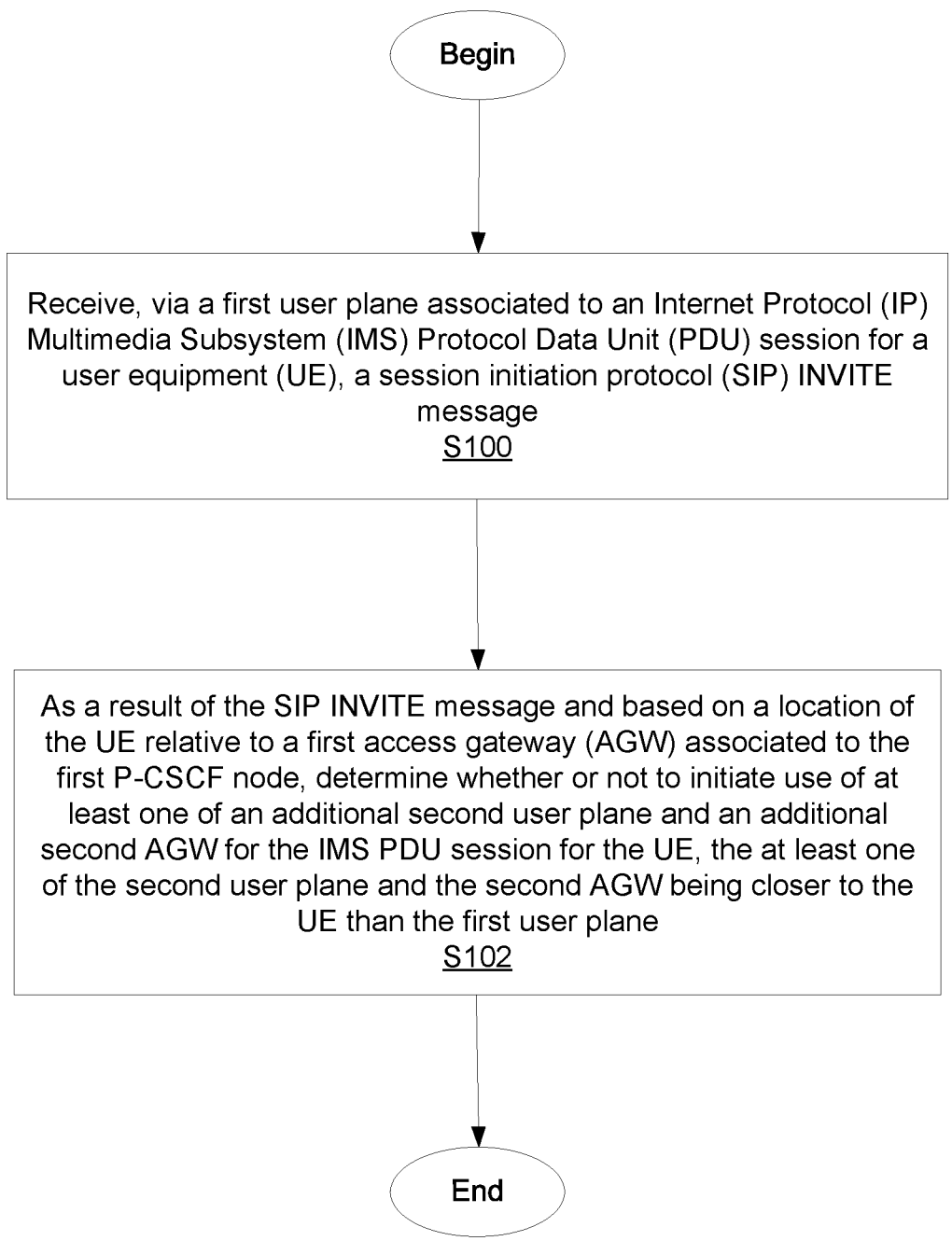
FIG. 3 is a flowchart of an example process in a P-CSCF node according to some embodiments of the present disclosure.

FIG. 3 is a flowchart of an example process in a P-CSCF node 18 for e.g., arranging the UP closer to the UE 22 when the UE 22 changes location according to some embodiments of the present disclosure. One or more Blocks and/or functions and/or methods performed by the P-CSCF node 18 may be performed by one or more elements of P-CSCF node 18 such as by requestor 26 in processing circuitry 36, memory 38, processor 40, communication interface 34, etc. according to the example process/method. The example process includes receiving (Block S100), such as via requestor 26, processing circuitry 36, memory 38, processor 40, and/or communication interface 34, via a first user plane associated to an Internet Protocol (IP) Multimedia Subsystem (IMS) Protocol Data Unit (PDU) session for a user equipment (UE), a session initiation protocol (SIP) INVITE message. The method includes e.g., as a result of the SIP INVITE message and/or based on a location of the UE relative to a first access gateway (AGW) associated to the first P-CSCF node, determining (Block S102), such as via requestor 26, processing circuitry 36, memory 38, processor 40, and/or communication interface 34, whether or not to initiate use of at least one of an additional second user plane and an additional second AGW for the IMS PDU session for the UE, the at least one of the second user plane and the second AGW being closer to the UE than the first user plane.

In some embodiments, determining, such as via requestor 26, processing circuitry 36, memory 38, processor 40, and/or communication interface 34, whether or not to initiate the use of the at least one of the additional second user plane and the additional second AGW for the IMS PDU session further includes determining, based on session information of the IMS PDU session, whether or not to initiate use of a local application server (AS) for the IMS PDU session for the UE. In some embodiments, determining, such as via requestor 26, processing circuitry 36, memory 38, processor 40, and/or communication interface 34, whether or not to initiate the use of the at least one of the additional second user plane and the additional second AGW for the IMS PDU session further includes determining based at least in part on a media type indicated in the session information.

In some embodiments, the method further includes subscribing, such as via requestor 26, processing circuitry 36, memory 38, processor 40, and/or communication interface 34, to an access and mobility management function (AMF) to be notified when a location of the UE is outside of a coverage area of the first AGW, the subscribing including at least one of geographic coordinates indicating the coverage area of the first AGW and geographic coordinates indicating the location of the UE. In some embodiments, the method further includes, as a result of the subscribing, receiving, such as via requestor 26, processing circuitry 36, memory 38, processor 40, and/or communication interface 34, a notification that the location of the UE is outside of the coverage area of the first AGW, the location of the UE indicated in geographic coordinates in the received notification. In some embodiments, the method includes, responsive to the received notification, selecting the additional second AGW that has a coverage area corresponding to the indicated location of the UE and/or identifying a second P-CSCF node that controls the second AGW.

In some embodiments, identifying, such as via requestor 26, processing circuitry 36, memory 38, processor 40, and/or communication interface 34, the additional second AGW further includes using a table indicating a plurality of AGWs, coverage areas associated with each of the plurality of AGWs and, for each of the plurality of AGWs, an identifier of a P-CSCF node controlling the corresponding one or more AGWs. In some embodiments, the method further includes communicating, such as via requestor 26, processing circuitry 36, memory 38, processor 40, and/or communication interface 34, with the second P-CSCF node, via a P-CSCF-to-P-CSCF interface, to initiate a context transfer to the second P-CSCF node.

In some embodiments, communicating with the second P-CSCF node, via a P-CSCF-to-P-CSCF interface, further includes one or more of: requesting that the second P-CSCF node reserve at least one Internet Protocol (IP) address in the second AGW for the second user plane and the local AS; providing, to the second P-CSCF node, addresses associated with the second user plane and the local AS to allow the second P-CSCF node to set-up the second AGW for the second user plane and the local AS for the IMS PDU session for the UE; receiving, from the second P-CSCF node, the addresses reserved in the second AGW for the second user plane and the local AS to use; and/or subscribing to the AMF to be notified when the location of the UE is outside of a coverage area of the second AGW.

Figure 4:
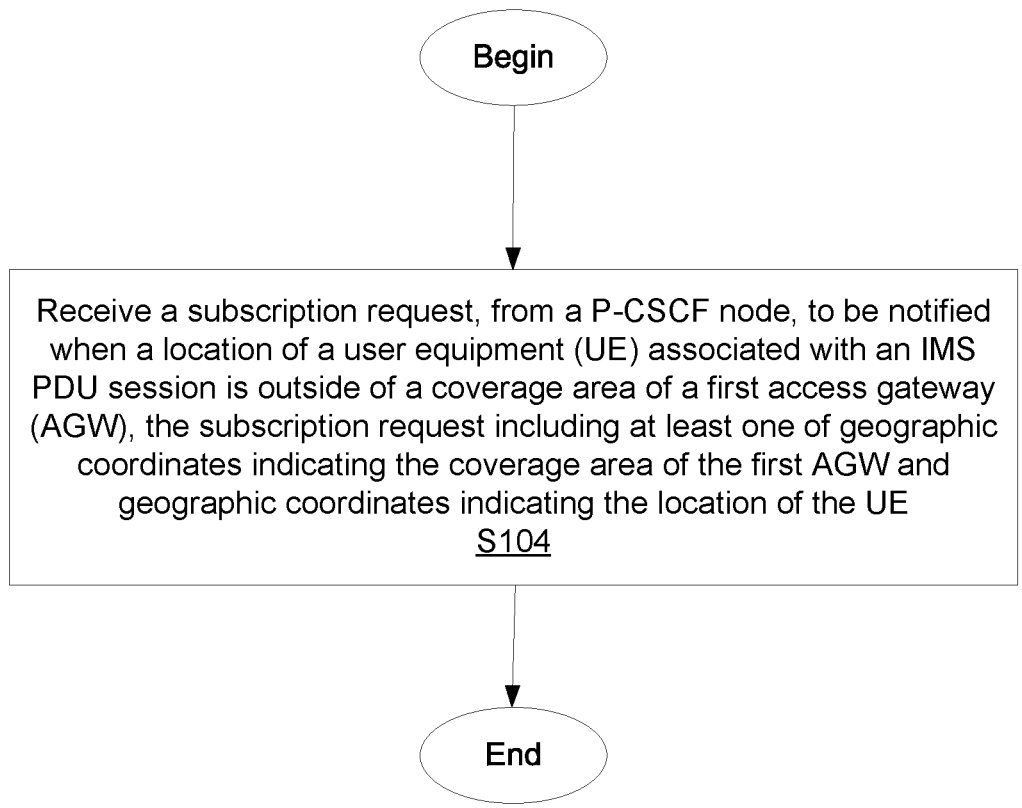
FIG. 4 is a flowchart of an example process in an AMF node according to some embodiments of the present disclosure.

FIG. 4 is a flowchart of an example process in an AMF node 12 for e.g., notifying the P-CSCF node 18 of a change in the UE location according to some embodiments of the present disclosure. One or more Blocks and/or functions and/or methods performed by the AMF node 12 may be performed by one or more elements of AMF node 12 such as notifier 28 in processing circuitry 44, memory 46, processor 48, communication interface 42, etc. according to the example process/method. The example process includes receiving (Block S104), such as via notifier 28, processing circuitry 44, memory 46, processor 48, communication interface 42, receiving a subscription request, from a P-CSCF node, to be notified when a location of a user equipment (UE) associated with an IMS PDU session is outside of a coverage area of a first access gateway (AGW), the subscription request including at least one of geographic coordinates indicating the coverage area of the first AGW and geographic coordinates indicating the location of the UE.

In some embodiments, the method further includes monitoring, such as via notifier 28, processing circuitry 44, memory 46, processor 48, communication interface 42, the location of the UE relative to the coverage area of the first AGW; and if the location of the UE moves outside of the coverage area of the first AGW, notifying, such as via notifier 28, processing circuitry 44, memory 46, processor 48, communication interface 42, the P-CSCF node that the location of the UE is outside of the coverage area of the first AGW, the location of the UE indicated in geographic coordinates in the notification.

Figure 5:
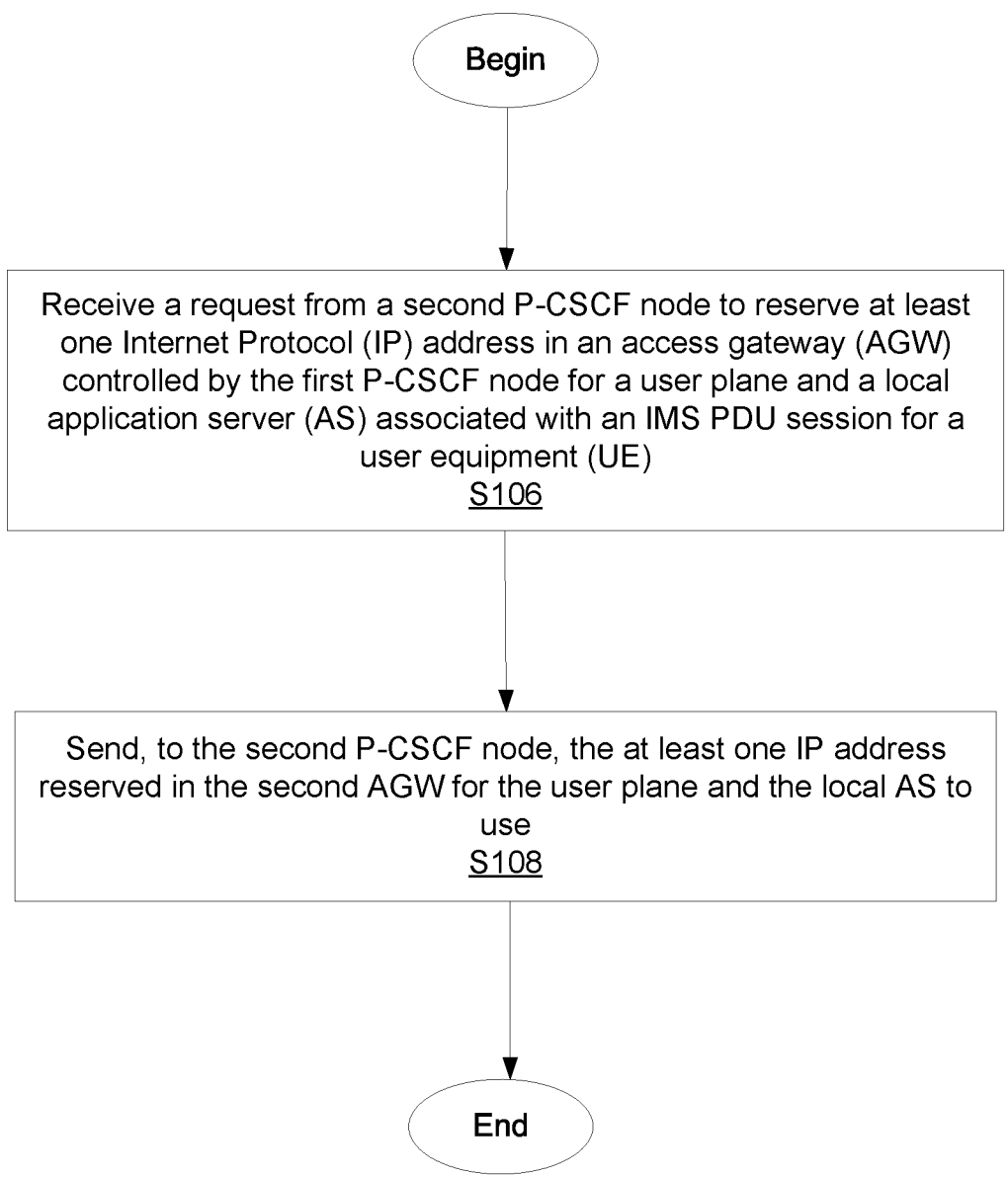
FIG. 5 is a flowchart of yet another example process in a P-CSCF node according to some embodiments of the present disclosure.

FIG. 5 is a flowchart of an example process in a P-CSCF node 18 (e.g., secondary P-CSCF node 18b) for e.g., setting up an AGW to support the closer UP when the UE 22 changes location according to some embodiments of the present disclosure. One or more Blocks and/or functions and/or methods performed by the P-CSCF node 18 may be performed by one or more elements of P-CSCF node 18 such as by reserver 30 in processing circuitry 36, memory 38, processor 40, communication interface 34, etc. according to the example process/method. The example process includes receiving (Block S106), such as via reserver 30, processing circuitry 36, memory 38, processor 40, and/or communication interface 34, a request from a second P-CSCF node to reserve at least one Internet Protocol (IP) address in an access gateway (AGW) controlled by the first P-CSCF node for a user plane and a local application server (AS) associated with an IMS PDU session for a user equipment (UE). The method includes sending (Block S108), such as via reserver 30, processing circuitry 36, memory 38, processor 40, and/or communication interface 34, to the second P-CSCF node, the at least one IP address reserved in the second AGW for the user plane and the local AS to use.

In some embodiments, the receiving and sending is via a P-CSCF-to-P-CSCF interface. In some embodiments, receiving includes receiving, from the second P-CSCF node, addresses associated with the user plane and the local AS to allow the first P-CSCF node to set-up the AGW for the user plane for the IMS PDU session for the UE.

In some embodiments, the method includes reserving, such as via reserver 30, processing circuitry 36, memory 38, processor 40, and/or communication interface 34, the requested addresses in the AGW for the user plane and the local AS to use.

Figure 6:
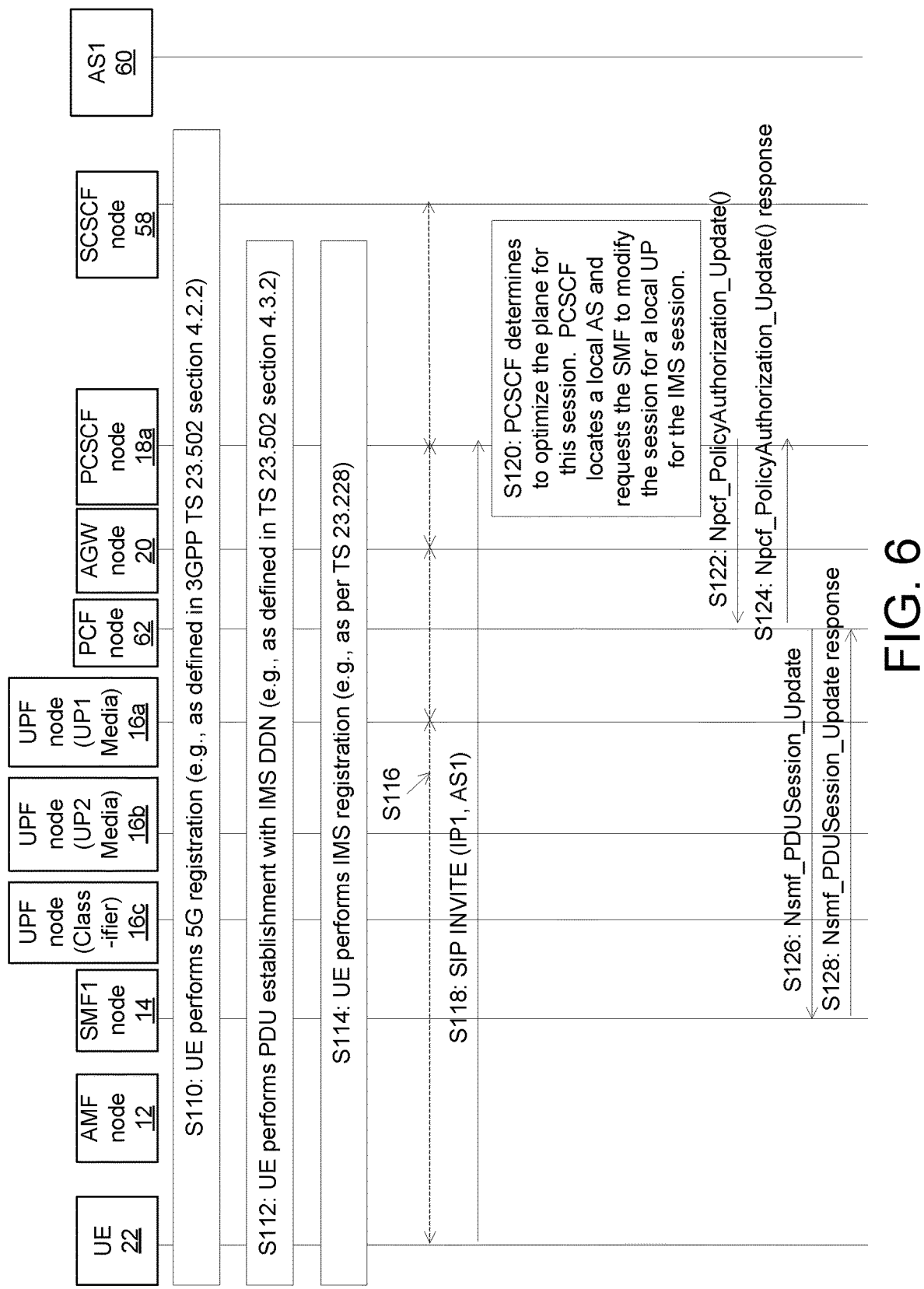
FIG. 6 is a call flow diagram illustrating an example process that may optimize a user plane (UP) when there is a UE location change according to one embodiment of the present disclosure.

Having generally described arrangements for e.g., P-CSCF to P-CSCF communication that may be used to, e.g., arrange the UP closer to the UE 22 when the UE 22 changes location, a more detailed description of some of the embodiments are provided as follows with reference to FIGS. 6-8, and which may be implemented by AMF node 12, P-CSCF node 18 and/or more generally the network node 32.

An example embodiment is described with reference to the call flow depicted in FIG. 6, as well as, FIGS. 7 and 8, which are continuations of the example call flow.

In step S110, the UE 22 performs a 5G registration (e.g., as defined in 3GPP Technical Specification (TS) 23.502, section 4.2.2). In step S112, the UE 22 performs a PDU establishment with an Internet Protocol (IP) Multimedia Subsystem (IMS) DDN (e.g., as defined in TS 23.502, section 4.3.2). In step S114, the UE 22 performs IMS registration (e.g., as defined in TS 23.228). When the IMS PDU session is setup in step S112, the user plane 1 (UP1) (e.g., UPF node 16a) is allocated by SMF1 14 to the UE 22 and the IMS SIP signaling now traverses through UP1 (e.g., UPF node 16a), as shown by the dashed line in step S116 between the UE 22 and SCSCF node 58.

In step S118, the UE 22 initiates a SIP INVITE with AS1 60 to the P-CSCF node 18a. In step S120, the P-CSCF node 18a may determine whether or not the UP for that IMS PDU session should be close to the UE 22. The P-CSCF node 18a may use the negotiated session information to determine if media optimization is desirable (e.g., would optimize the UP). For example, if the P-CSCF node 18a determines that the session is a video streaming session and the P-CSCF node 18a can locate an AS close to the UE 22, then media optimization is desirable and may be initiated by the P-CSCF node 18. On the other hand, if, for example, the session is a Voice-over LTE (VOLTE) session, then media optimization may not be applicable. The P-CSCF node 18a may select an AGW 20 that is close to the UE 22 (e.g., closer to the UE 22 than the current AGW 20 for the current UP) for the media.

In steps S122-S128, the P-CSCF node 18a requests a policy update from a PCF node 62 to modify the PDU session for the UE 22 and to allocate a new UP (e.g., UP2 media/UPF node 16b) close to the UE 22 for the IMS session (e.g., closer to the UE 22 than the current UP1/UPF1 node 16a). The P-CSCF node 18a may not impact the SIP signaling PDU session which continues to use UP1 (e.g., UP1 SIP/UPF node 16a).

Figure 7:
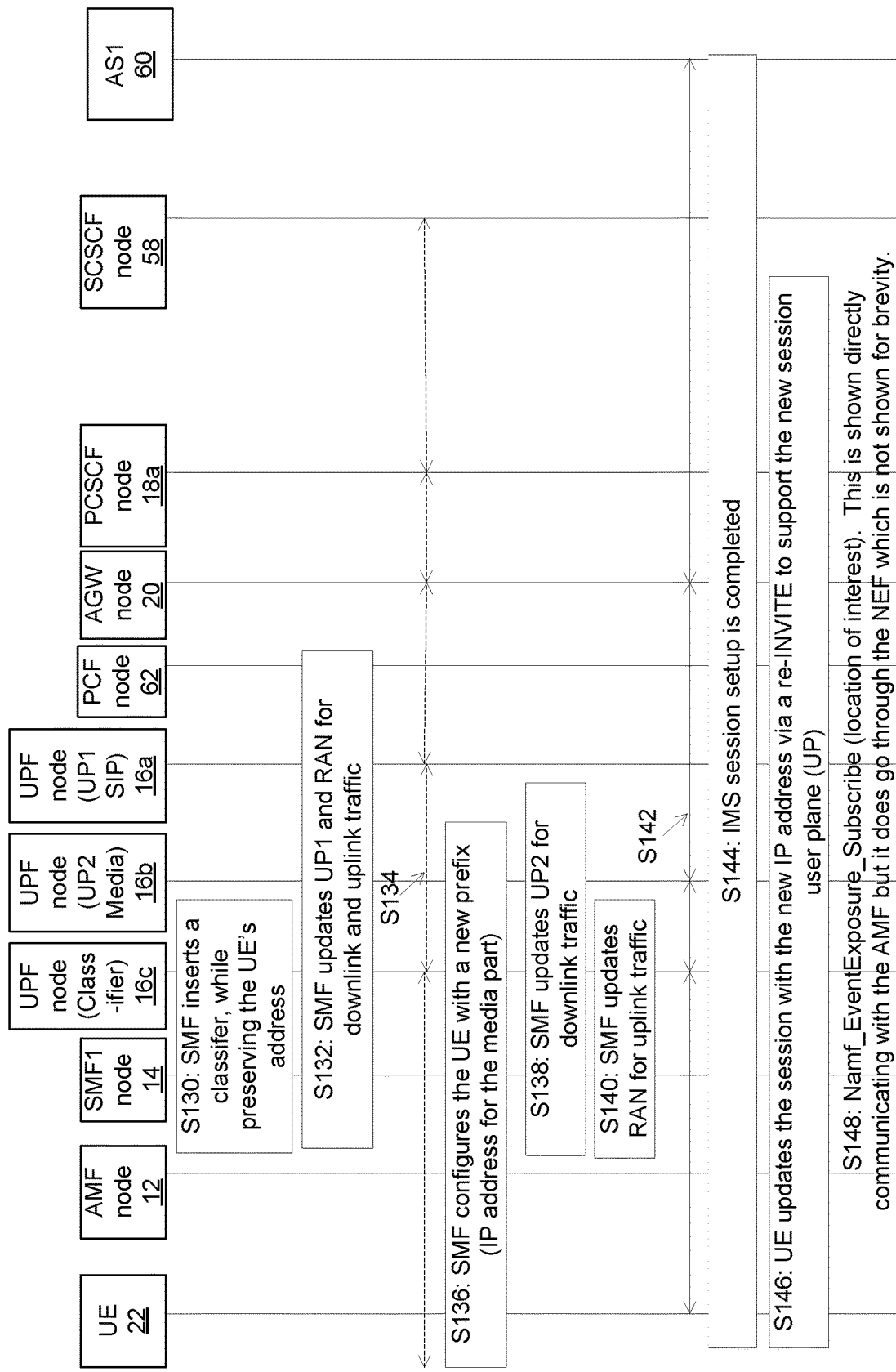
FIG. 7 is a continuation of the call flow diagram of FIG. 6 according to some embodiments of the present disclosure.

Referring now to FIG. 7, a continuation of the example call flow is described. In steps S130-S140, the SMF1 node 14 may now allocate a new UP2 (e.g., UPF node 16b) for the media associated with the UE 22. Thus, the UE 22 may be allocated a new IP address anchored in UP2 (e.g., UPF node 16b) associated with the media and which is close to the UE 22 location (e.g., closer to the UE 22 than the current UP1 (UPF1 node 16a). The UE 22 may retain the IP address anchored in UP1 (e.g., UPF node 16a) for SIP signaling only (hence, the term SIP shown in FIG. 7 beneath UP1). The SMF node 14 may engage a UP classifier (e.g., UPF node 16c) to accomplish this (e.g., to arrange SIP signaling for UP1 and media for UP2 to the UE 22). After that SIP traffic flows through UP1, while the media flows the UP2 and the AGW1 (e.g., target AGW node 20).

At least some behavior/communication in steps S130-S140 may be based on e.g., 3GPP Technical Specification (TS) 23.502, section 4.3.5.4, which may be incorporated herein by reference. To summarize, in step S130, the SMF node 14 inserts a classifier and, in step S132, updates the downlink and the uplink for the SIP signalling traffic which now goes through the UP classifier (e.g., UPF node 16c), the UP1 (UPF node 16a) and the AGW node 20, to the IMS domain, as shown in step S134.

In step S136, the SMF node 14 allocates UP2 (e.g., UPF node 16b) for the IMS session (media part) and configures the UE 22 with a new IP address for the IMS session (media part).

In steps S138 and S140, the SMF node 14 updates the uplink and downlink for the IMS media which now can be seen in step S142, flowing through the UP classifier (e.g., UPF node 16c), UP2 (e.g., UPF node 16b) and AGW node 20.

In step S144, the IMS session setup is complete; however, since the UE 22 has used an address allocated in UP1, while the media will use UP2, the UE 22 may send, in step S146, a SIP re-INVITE message (e.g., to the primary P-CSCF node 18a) to update the new IP address used for that session to support use of the new UP2 for media.

In step S148, the P-CSCF node 18a subscribes to the AMF node 12 (via the network exposure function (NEF) although not shown) to be notified when the UE 22 leaves the coverage area of the AGW node 20. In existing networks, only cell identifiers (IDs), or tracking area can be specified as an area of interest, but in some embodiments of the present disclosure, the P-CSCF node 18a may specify a location of interest (e.g., UE 22 location, AGW coverage area, etc.) based on geographic location/coordinates, such as, for example, the Digital cellular telecommunications system (Phase 2+); Universal Geographical Area Description (GAD) (3GPP TS 03.32 version 7.2.0 Release 1998). The P-CSCF node 18a and the AMF node 12 may be configured to support this specification for specifying a location of interest using geographical coordinates.

Figure 8:
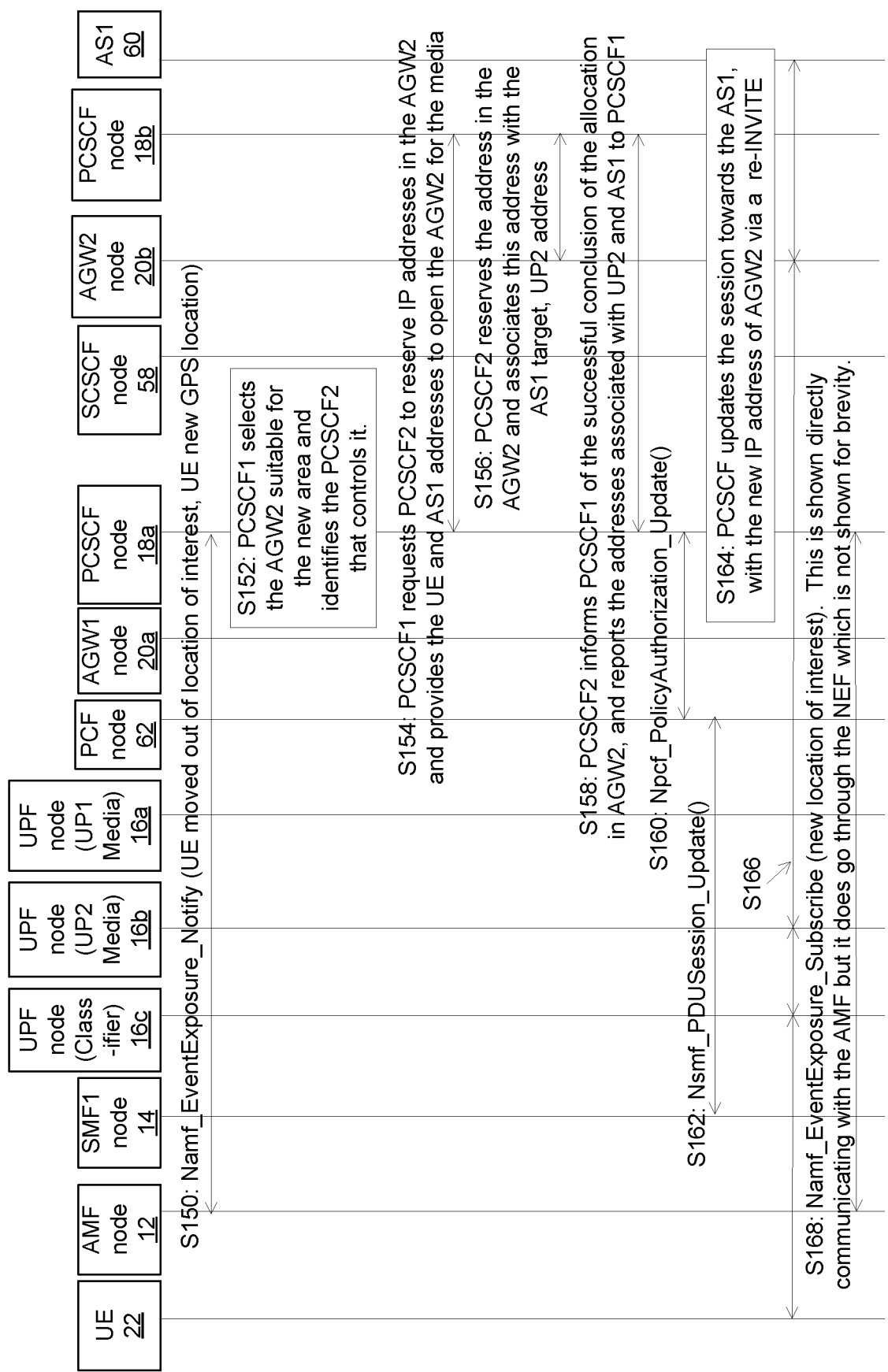
FIG. 8 is a continuation of the call flow diagram of FIG. 7 according to some embodiments of the present disclosure.

Referring now to FIG. 8, a continuation of the example call flow is described. In step S150, the P-CSCF node 18a is notified (e.g., by the AMF node 12) that the UE 22 moved from the area of interest (e.g., coverage area of primary AGW1 node 20a associated with primary P-CSCF node 18a) and, as a result, the P-CSCF node 18a may determine to allocate a new/closer AGW2 node 20b for the UE 22. The notification may include the UE's 22 new geographical coordinates.

In step S152, the P-CSCF node 18a is configured with the information that is used to determine the target AGW2 node 20b appropriate for the new area in which the UE 22 is located and/or to determine the secondary P-CSCF2 (e.g., the P-CSCF node 18b) controlling that target AGW2 node 20b. In some embodiments, each P-CSCF node 18 will be configured or pre-configured with a table, or the like, that includes all locations of interest (e.g., geographic coordinates defining each AGW coverage area), identified as per e.g., the ETSI/3GPP specification mentioned above, for the public land mobile network (PLMN) that the operator is responsible for, the AGW identities that can be used in each (one or more) location area, and an identity of the P-CSCF node 18 controlling the respective AGW node 20. This can enable the P-CSCF node 18 to use this table in conjunction with the UE 22 location received in the notification in order to locate the secondary P-CSCF (e.g., P-CSCF node 18b) and/or secondary/target AGW2 (e.g., AGW2 node 20b).

In step S154, the primary P-CSCF1 (e.g., P-CSCF node 18a) communicates (e.g., via interface 21) with the secondary P-CSCF2 (e.g., P-CSCF node 18b) to request the proper addresses to enable the target AGW2 node 20b to be used for media. As stated before, in some embodiments, the primary P-CSCF1 (e.g., P-CSCF node 18a) may control the secondary AGW2 node 20b identical to how it controls its own AGW1 node 20a. The primary P-CSCF1 node 18a may send to the secondary P-CSCF2 node 18b the UP2 (e.g., UPF2 node 16b) and AS1 addresses so that the secondary P-CSCF2 node 18*b* can allocate the proper addresses in the target AGW2 node 20*b* and allow the media to pass through from the UP2 (e.g., UPF2 node 16*b*) to AS1 to flow through the target AGW2 node 20*b*.

In step S156, the secondary P-CSCF2 18*b* may allocate the required addresses in the AGW2 node 20*b* to allow the media associated with the IMS PDU session of the UE 22 to flow through AGW2 node 20*b* (instead of the AGW1 node 20*a*). Additionally, in step S156, the secondary P-CSCF2 18*b*, opens the necessary pin holes in the AGW2 node 20*b* for the media to go through.

In step S158, the secondary P-CSCF2 node 18*b* may report to the primary P-CSCF1 node 18*a* (e.g., via interface 21) the successful allocation has occurred and may report the new addresses in the AGW2 node 20*b* for the UP2 and AS1 to use.

In steps S160 and S162, the primary P-CSCF1 node 18*a* modifies the PCF authorization policy to enable the SMF node 14 to modify the session so that UP2 now uses the AGW2 node 20*b* address provided in step S158.

In step S165, the P-CSCF 18 updates the IMS session so that AS1 now also communicates with the AGW2 node 20*b* using the address provided in step S158. Such communication of AS1 with AGW2 node 20*b* using the address is shown in the call flow lines indicated by S166.

The new flow of the media is shown in step S166.

In step S168, the primary P-CSCF1 node 18*a* then subscribes to the new location of interest (e.g., geographic coordinates defining the coverage area of AGW2 and/or the new UE location) based on the new UE 22 location received in step S150.

In some embodiments, e.g., where one P-CSCF may be associated to more than one AGW, one or more of the steps discussed above as being performed by the secondary P-CSCF may occur internally at the primary P-CSCF in order to redirect the media traffic to the new AGW that is closer to the changed UE location.

Some embodiments may include one or more of the following:

Embodiment A1. A method implemented in a first proxy-call session control function (P-CSCF) node, the method comprising:
receiving, via a first user plane associated to an Internet Protocol (IP) Multimedia Subsystem (IMS) Protocol Data Unit (PDU) session for a user equipment (UE), a session initiation protocol (SIP) INVITE message; and
as a result of the SIP INVITE message and/or based on a location of the UE relative to a first access gateway (AGW) associated to the first P-CSCF node, determining whether or not to initiate use of an additional second user plane and/or an additional second AGW for the IMS PDU session for the UE, the second user plane and/or the second AGW being closer to the UE than the first user plane.

Embodiment A2. The method of Embodiment A1, wherein determining whether or not to initiate the use of the additional second user plane for the IMS PDU session further comprises:
determining, based on session information of the IMS PDU session, whether or not to initiate use of a local application server (AS) for the IMS PDU session for the UE.

Embodiment A3. The method of Embodiment A2, wherein determining whether or not to initiate the use of the additional second user plane for the IMS PDU session further comprises determining based at least in part on a media type indicated in the session information.

Embodiment A4. The method of any one of Embodiments A1-A3, further comprising:
subscribing to an access and mobility management function (AMF) to be notified when a location of the UE is outside of a coverage area of the first AGW, the subscribing including at least one of geographic coordinates indicating the coverage area of the first AGW and geographic coordinates indicating the location of the UE.

Embodiment A5. The method of Embodiment A4, further comprising:
as a result of the subscribing, receiving a notification that the location of the UE is outside of the coverage area of the first AGW, the location of the UE indicated in geographic coordinates in the received notification; and/or responsive to the received notification, selecting the additional second AGW that has a coverage area corresponding to the indicated location of the UE and/or identifying a second P-CSCF node that controls the second AGW.

Embodiment A6. The method of Embodiment A5, wherein identifying the additional second AGW further comprises:
using a table indicating a plurality of AGWs, coverage areas associated with each of the plurality of AGWs and, for each of the plurality of AGWs, an identifier of a P-CSCF node controlling the corresponding one or more AGWs.

Embodiment A7. The method of any one of Embodiments A5 and A6, further comprising:
communicating with the second P-CSCF node, via a P-CSCF-to-P-CSCF interface, to initiate a context transfer to the second P-CSCF node.

Embodiment A8. The method of Embodiment A7, wherein communicating with the second P-CSCF node, via a P-CSCF-to-P-CSCF interface, further comprises one or more of:
requesting that the second P-CSCF node reserve at least one Internet Protocol (IP) address in the second AGW for the second user plane and the local AS;
providing, to the second P-CSCF node, addresses associated with the second user plane and the local AS to allow the second P-CSCF node to set-up the second AGW for the second user plane and the local AS for the IMS PDU session for the UE;
receiving, from the second P-CSCF node, the addresses reserved in the second AGW for the second user plane and the local AS to use; and/or subscribing to the AMF to be notified when the location of the UE is outside of a coverage area of the second AGW.

Embodiment B1. A first proxy-call session control function (P-CSCF) node, the first P-CSCF node comprising processing circuitry, the processing circuitry configured to cause the first P-CSCF node to:
receive, via a first user plane associated to an IMS PDU session for a user equipment (UE), a session initiation protocol (SIP) INVITE message; and
as a result of the SIP INVITE message and/or based on a location of the UE relative to a first access gateway (AGW) associated to the first P-CSCF node, determine whether or not to initiate use of an additional second user plane and/or an additional second AGW for the IMS PDU session for the UE, the second user plane and/or the second AGW being closer to the UE than the first user plane.

Embodiment B2. The first P-CSCF node of Embodiment B1, wherein the processing circuitry is further configured to cause the first P-CSCF node to determine whether or not to initiate the use of the additional second user plane for the IMS PDU session by being configured to cause the first P-CSCF node to:
  determine, based on session information of the IMS PDU session, whether or not to initiate use of a local application server (AS) for the IMS PDU session for the UE.

Embodiment B3. The first P-CSCF node of Embodiment B2, wherein the processing circuitry is further configured to cause the first P-CSCF node to determine whether or not to initiate the use of the additional second user plane for the IMS PDU session by being configured to cause the first P-CSCF node to:
  determine based at least in part on a media type indicated in the session information.

Embodiment B4. The first P-CSCF node of any one of Embodiments B1-B3, wherein the processing circuitry is further configured to cause the first P-CSCF node to:
  subscribe to an access and mobility management function (AMF) to be notified when a location of the UE is outside of a coverage area of the first AGW, the subscription request including at least one of geographic coordinates indicating the coverage area of the first AGW and geographic coordinates indicating the location of the UE.

Embodiment B5. The first P-CSCF node of Embodiment B4, wherein the processing circuitry is further configured to cause the first P-CSCF node to:
  as a result of the subscription, receive a notification that the location of the UE is outside of the coverage area of the first AGW, the location of the UE indicated in geographic coordinates in the received notification; and/or
  responsive to the received notification, select the additional second AGW that has a coverage area corresponding to the indicated location of the UE and/or identify a second P-CSCF node that controls the second AGW.

Embodiment B6. The first P-CSCF node of Embodiment B5, wherein the processing circuitry is further configured to cause the first P-CSCF node to identify the additional second AGW by being configured to cause the first P-CSCF node to:
  use a table indicating a plurality of AGWs, coverage areas associated with each of the plurality of AGWs and, for each of the plurality of AGWs, an identifier of a P-CSCF node controlling the corresponding one or more AGWs.

Embodiment B7. The first P-CSCF node of any one of Embodiments B5 and B6, wherein the processing circuitry is further configured to cause the first P-CSCF node to:
  communicate with the second P-CSCF node, via a P-CSCF-to-P-CSCF interface, to initiate a context transfer to the second P-CSCF node.

Embodiment B8. The first P-CSCF node of Embodiment B7, wherein the processing circuitry is further configured to cause the first P-CSCF node to communicate with the second P-CSCF node, via a P-CSCF-to-P-CSCF interface, by being configured to cause the first P-CSCF node to one or more of:
  request that the second P-CSCF node reserve at least one Internet Protocol (IP) address in the second AGW for the second user plane and the local AS;
  provide, to the second P-CSCF node, addresses associated with the second user plane and the local AS to allow the second P-CSCF node to set-up the second AGW for the second user plane and the local AS for the IMS PDU session for the UE;
  receive, from the second P-CSCF node, the addresses reserved in the second AGW for the second user plane and the local AS to use; and/or subscribe to the AMF to be notified when the location of the UE is outside of a coverage area of the second AGW.

Embodiment C1. A method implemented in an access and mobility management (AMF) node, the method comprising:
  receiving a subscription request, from a P-CSCF node, to be notified when a location of a user equipment (UE) associated with an IMS PDU session is outside of a coverage area of a first access gateway (AGW), the subscription request including at least one of geographic coordinates indicating the coverage area of the first AGW and geographic coordinates indicating the location of the UE.

Embodiment C2. The method of Embodiment C1, further comprising:
  monitoring the location of the UE relative to the coverage area of the first AGW; and
  if the location of the UE moves outside of the coverage area of the first AGW, notifying the P-CSCF node that the location of the UE is outside of the coverage area of the first AGW, the location of the UE indicated in geographic coordinates in the notification.

Embodiment D1. An access and mobility management (AMF) node, the AMF node comprising processing circuitry, the processing circuitry configured to cause the AMF node to:
  receive a subscription request, from a P-CSCF node, to be notified when a location of a user equipment (UE) associated with an IMS PDU session is outside of a coverage area of a first access gateway (AGW), the subscription request including at least one of geographic coordinates indicating the coverage area of the first AGW and geographic coordinates indicating the location of the UE.

Embodiment D2. The AMF node of Embodiment D1, wherein the processing circuitry is further configured to cause the AMF node:
  monitor the location of the UE relative to the coverage area of the first AGW; and
  if the location of the UE moves outside of the coverage area of the first AGW, notify the P-CSCF node that the location of the UE is outside of the coverage area of the first AGW, the location of the UE indicated in geographic coordinates in the notification.

Embodiment E1. A method implemented in a first proxy-call session control function (P-CSCF) node, the method comprising one or more of:
  receiving a request from a second P-CSCF node to reserve at least one Internet Protocol (IP) address in an access gateway (AGW) controlled by the first P-CSCF node for a user plane and a local application server (AS) associated with an IMS PDU session for a user equipment (UE); and/or
  sending, to the second P-CSCF node, the at least one IP address reserved in the second AGW for the user plane and the local AS to use.

Embodiment E2. The method of Embodiment E1, wherein one or more of:
  the receiving and sending is via a P-CSCF-to-P-CSCF interface; and
  receiving includes receiving, from the second P-CSCF node, addresses associated with the user plane and the local AS to allow the first P-CSCF node to set-up the AGW for the user plane for the IMS PDU session for the UE.

Embodiment E3. The method of any one of Embodiments E1 and E2, further comprising:
  reserving the requested addresses in the AGW for the user plane and the local AS to use.

Embodiment F1. A first proxy-call session control function (P-CSCF) node, the first P-CSCF node comprising processing circuitry, the processing circuitry configured to cause the first P-CSCF node to one or more of:
  receive a request from a second P-CSCF node to reserve at least one Internet Protocol (IP) address in an access gateway (AGW) controlled by the first P-CSCF node for a user plane and a local application server (AS) associated with an IMS PDU session for a user equipment (UE); and/or
  send, to the second P-CSCF node, the at least one IP address reserved in the second AGW for the user plane and the local AS to use.

Embodiment F2. The first P-CSCF node of Embodiment F1, wherein the processing circuitry is further configured to cause the first P-CSCF node to one or more of:
  receive and send via a P-CSCF-to-P-CSCF interface; and
  receive, from the second P-CSCF node, addresses associated with the user plane and the local AS to allow the first P-CSCF node to set-up the AGW for the user plane for the IMS PDU session for the UE.

Embodiment F3. The first P-CSCF node of any one of Embodiments F1 and F2, wherein the processing circuitry is further configured to cause the first P-CSCF node to:
  reserve the requested addresses in the AGW for the user plane and the local AS to use.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a first proxy-call session control function (P-CSCF) node, the method comprising:
  receiving, via a first user plane associated to an Internet Protocol (IP) Multimedia Subsystem (IMS) Protocol Data Unit (PDU), session for a user equipment (UE), a session initiation protocol (SIP) INVITE message; and
  as a result of the SIP INVITE message and based on a location of the UE relative to a first access gateway (AGW), associated to the first P-CSCF node, determining whether or not to initiate use of at least one of an additional second user plane and an additional second AGW for the IMS PDU session for the UE,
wherein determining whether or not to initiate the use of the at least one of the additional second user plane and the additional second AGW for the IMS PDU session comprises:
determining, based at least in part on a media type indicated in session information of the IMS PDU session, whether or not to initiate use of a local application server (AS) for the IMS PDU session for the UE, and
wherein the at least one of the second user plane and the second AGW being closer to the UE than the first user plane.

2. The method of claim 1, further comprising:
subscribing to an access and mobility management function (AMF), to be notified when the location of the UE is outside of a coverage area of the first AGW, the subscribing including at least one of geographic coordinates indicating the coverage area of the first AGW and geographic coordinates indicating the location of the UE, and/or
as a result of the subscribing, receiving a notification that the location of the UE is outside of the coverage area of the first AGW, the location of the UE being indicated in geographic coordinates in the received notification; and
responsive to the received notification, selecting the additional second AGW that has a coverage area corresponding to the indicated location of the UE and/or identifying a second P-CSCF node that controls the second AGW.

3. The method of claim 2, wherein identifying the additional second AGW comprises:
using a table indicating a plurality of AGWs, coverage areas associated with each of the plurality of AGWs and, for each of the plurality of AGWs, an identifier of a P-CSCF node controlling the corresponding one or more AGWs.

4. The method of claim 2, further comprising:
communicating with the second P-CSCF node, via a P-CSCF-to-P-CSCF interface, to initiate a context transfer to the second P-CSCF node; and/or
wherein communicating with the second P-CSCF node, via a P-CSCF-to-P-CSCF interface, comprises at least one of:
requesting that the second P-CSCF node reserve at least one Internet Protocol (IP) address in the second AGW for the second user plane and the local AS;
providing, to the second P-CSCF node, addresses associated with the second user plane and the local AS to allow the second P-CSCF node to set-up the second AGW for the second user plane and the local AS for the IMS PDU session for the UE;
receiving, from the second P-CSCF node, the addresses reserved in the second AGW for the second user plane and the local AS to use; and
subscribing to the AMF to be notified when the location of the UE is outside of a coverage area of the second AGW.

5. The method of claim 1, wherein the method implemented in the first proxy-call session control function (P-CSCF), node comprising:
receiving a request from a second P-CSCF node to reserve at least one Internet Protocol (IP) address in an access gateway (AGW), controlled by the first P-CSCF node for a user plane and the local application server (AS) associated with the IMS PDU session for the user equipment (UE); and
sending, to the second P-CSCF node, the at least one IP address reserved in the second AGW for the user plane and the local AS to use.

6. The method of claim 5, wherein at least one of:
the receiving and sending is via a P-CSCF-to-P-CSCF interface; and
receiving includes receiving, from the second P-CSCF node, addresses associated with the user plane and the local AS to allow the first P-CSCF node to set-up the AGW for the user plane for the IMS PDU session for the UE.

7. The method of claim 5, further comprising:
reserving the requested at least one IP address in the AGW for the user plane and the local AS to use.

8. A first proxy-call session control function (P-CSCF) node, the first P-CSCF node comprising processing circuitry, the processing circuitry configured to cause the first P-CSCF node to:
receive, via a first user plane associated to an IMS PDU session for a user equipment (UE), a session initiation protocol (SIP) INVITE message; and
as a result of the SIP INVITE message and based on a location of the UE relative to a first access gateway (AGW), associated to the first P-CSCF node, determine whether or not to initiate use of at least one of an additional second user plane and an additional second AGW for the IMS PDU session for the UE,
wherein determining whether or not to initiate the use of the at least one of the additional second user plane and the additional second AGW for the IMS PDU session comprises:
determining, based at least in part on a media type indicated in session information of the IMS PDU session, whether or not to initiate use of a local application server, AS, for the IMS PDU session for the UE, and
wherein the at least one of the second user plane and the second AGW being is closer to the UE than the first user plane.

9. The first P-CSCF node of claim 8, wherein the processing circuitry is further configured to cause the first P-CSCF node to:
send a subscription request for subscribing to an access and mobility management function (AMF) to be notified when the location of the UE is outside of a coverage area of the first AGW, the subscription request including at least one of geographic coordinates indicating the coverage area of the first AGW and geographic coordinates indicating the location of the UE; and/or
as a result of the subscription, receive a notification that the location of the UE is outside of the coverage area of the first AGW, the location of the UE being indicated in geographic coordinates in the received notification; and
responsive to the received notification, select the additional second AGW that has a coverage area corresponding to the indicated location of the UE and/or identify a second P-CSCF node that controls the second AGW.

10. The first P-CSCF node of claim 9, wherein the processing circuitry is further configured to cause the first P-CSCF node to identify the additional second AGW by being configured to cause the first P-CSCF node to:

use a table indicating a plurality of AGWs, coverage areas associated with each of the plurality of AGWs and, for each of the plurality of AGWs, an identifier of a P-CSCF node controlling the corresponding one or more AGWs.

11. The first P-CSCF node of claim 10, wherein the processing circuitry is further configured to cause the first P-CSCF node to:
communicate with the second P-CSCF node, via a P-CSCF-to-P-CSCF interface, to initiate a context transfer to the second P-CSCF node; and/or
wherein the processing circuitry is further configured to cause the first P-CSCF node to communicate with the second P-CSCF node, via a P-CSCF-to-P-CSCF interface, by being configured to cause the first P-CSCF node to at least one of:
request that the second P-CSCF node reserve at least one Internet Protocol, IP, address in the second AGW for the second user plane and the local AS;
provide, to the second P-CSCF node, addresses associated with the second user plane and the local AS to allow the second P-CSCF node to set-up the second AGW for the second user plane and the local AS for the IMS PDU session for the UE;
receive, from the second P-CSCF node, the addresses reserved in the second AGW for the second user plane and the local AS to use; and
subscribe to the AMF to be notified when the location of the UE is outside of a coverage area of the second AGW.

12. The first P-CSCF node of claim 8, wherein the processing circuitry is further configured to cause the first P-CSCF node to:
receive a request from a second P-CSCF node to reserve at least one Internet Protocol (IP) address in an access gateway (AGW), controlled by the first P-CSCF node for a user plane and the local application server (AS), associated with the IMS PDU session for the user equipment (UE); and
send, to the second P-CSCF node, the at least one IP address reserved in the second AGW for the user plane and the local AS to use.

13. The first P-CSCF node of claim 12, wherein the processing circuitry is further configured to cause the first P-CSCF node to at least one of:
receive and send via a P-CSCF-to-P-CSCF interface; and
receive, from the second P-CSCF node, addresses associated with the user plane and the local AS to allow the first P-CSCF node to set-up the AGW for the user plane for the IMS PDU session for the UE.

14. The first P-CSCF node of claim 12, wherein the processing circuitry is further configured to cause the first P-CSCF node to:
reserve the requested at least one IP address in the AGW for the user plane and the local AS to use.

15. A method implemented in an access and mobility management (AMF) node, the method comprising:
receiving a subscription request, from a P-CSCF node, to be notified when a location of a user equipment (UE), associated with an IMS PDU session is outside of a coverage area of a first access gateway (AGW), the subscription request including at least one of geographic coordinates indicating the coverage area of the first AGW and geographic coordinates indicating the location of the UE.

16. The method of claim 15, further comprising:
monitoring the location of the UE relative to the coverage area of the first AGW; and
if the location of the UE moves outside of the coverage area of the first AGW, notifying the P-CSCF node that the location of the UE is outside of the coverage area of the first AGW, the location of the UE being indicated in geographic coordinates in the notification.

17. An access and mobility management (AMF) node, the AMF node comprising processing circuitry, the processing circuitry configured to cause the AMF node to:
receive a subscription request, from a P-CSCF node, to be notified when a location of a user equipment, UE, associated with an IMS PDU session is outside of a coverage area of a first access gateway, AGW, the subscription request including at least one of geographic coordinates indicating the coverage area of the first AGW and geographic coordinates indicating the location of the UE.

18. The AMF node of claim 17, wherein the processing circuitry is further configured to cause the AMF node to:
monitor the location of the UE relative to the coverage area of the first AGW; and
if the location of the UE moves outside of the coverage area of the first AGW, notify the P-CSCF node that the location of the UE is outside of the coverage area of the first AGW, the location of the UE being indicated in geographic coordinates in the notification.

* * * * *